United States Patent
Christie et al.

[11] 3,903,948
[45] Sept. 9, 1975

[54] TRANSVERSE FLASH BREAKING IN TIRE MANUFACTURE

[75] Inventors: Christopher E. Christie, Akron; Paul E. Appleby, Cuyahoga Falls; Frank R. Tully, Hudson, all of Ohio

[73] Assignee: The Goodyear Tire & Rubber Company, Akron, Ohio

[22] Filed: Sept. 27, 1974

[21] Appl. No.: 509,770

Related U.S. Application Data

[62] Division of Ser. No. 387,882, Aug. 13, 1973, Pat. No. 3,856,070.

[52] U.S. Cl. .................. 157/13; 30/299; 83/914; 425/806
[51] Int. Cl.² ........................................ B29H 21/00
[58] Field of Search ............ 157/13; 83/914; 225/1; 30/299; 425/806, 12, 15, 16

[56] References Cited
UNITED STATES PATENTS

| | | | |
|---|---|---|---|
| 2,810,193 | 10/1957 | Glodde | 83/914 X |
| 2,986,204 | 5/1961 | Wilson et al. | 157/13 |
| 3,763,914 | 10/1973 | Vance | 157/13 |

*Primary Examiner*—Donald R. Schran
*Assistant Examiner*—Leon Gilden
*Attorney, Agent, or Firm*—F. W. Brunner; R. S. Washburn

[57] ABSTRACT

A method and apparatus for alleviating the sound generated in use by tires having flash extending transversely of the tread by puncturing or penetrating and tearing the flash extending between the walls of circumferentially endless grooves in the tire tread.

4 Claims, 2 Drawing Figures

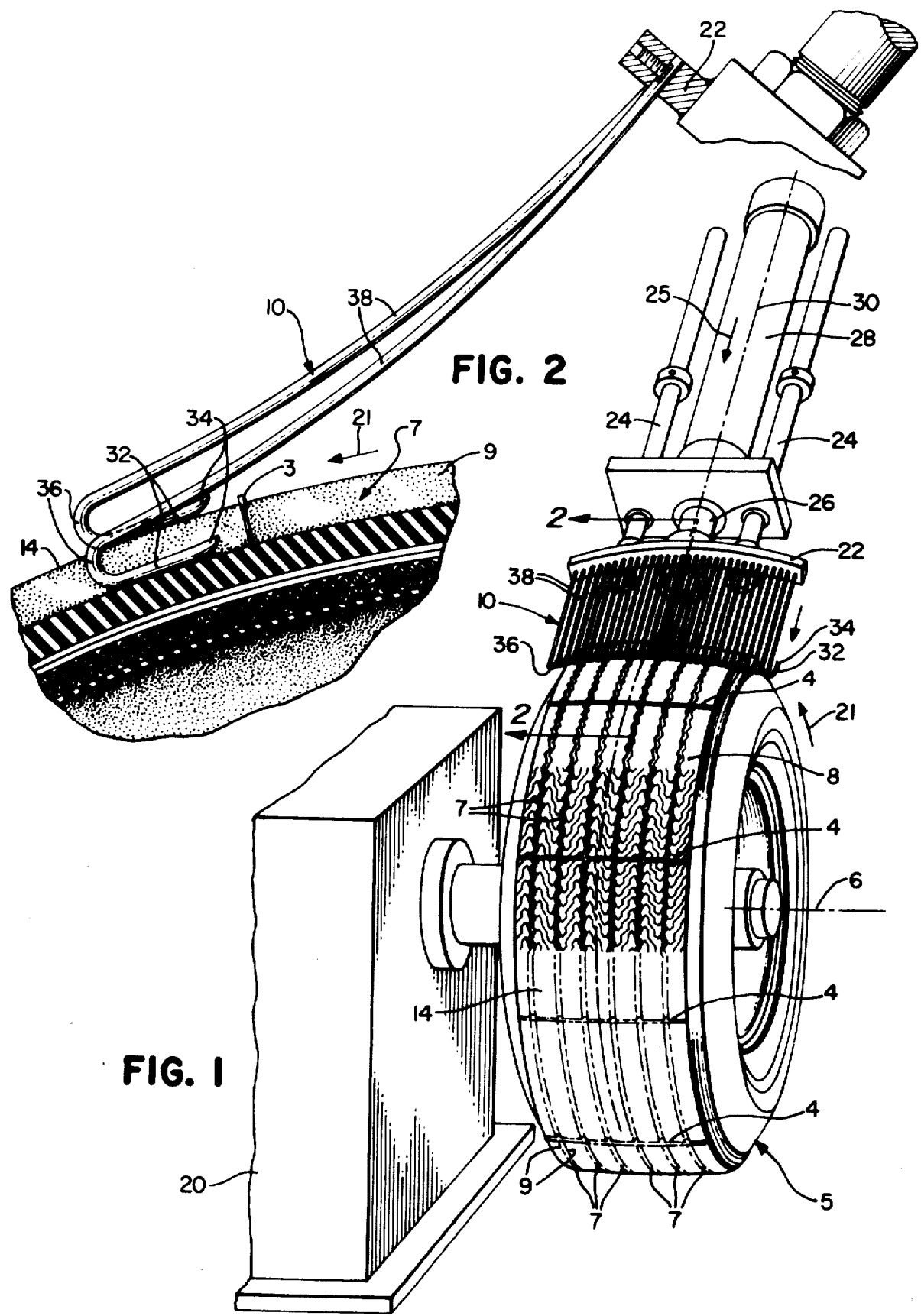

TRANSVERSE FLASH BREAKING IN TIRE MANUFACTURE

This application is a division of application Ser. No. 387,882 filed Aug. 13, 1973 now U.S. Pat. No. 3,856,070.

The foregoing abstract is not to be taken as limiting the invention of this application, and in order to understand the full nature and extent of the technical disclosure of this application, reference must be made to the accompanying drawing and the following detailed description.

The present invention relates to treating tires and particularly for breaking or tearing mold flash. Still more particularly, the invention relates to methods and apparatus for breaking mold flash extending transversely of the circumferential grooves in the tread of a tire.

It is well known that small portions of rubber tend to be extruded from a two-piece mold cavity during the molding and curing of a tire and that such spew, extrusion, or the like, which is commonly called mold flash, remains on the finished tire after its removal from the mold. Such flash is often considered undesirable by some persons, but is generally objectionable only in appearance and is not believed to produce any undesirable effects in the operation of the tire when mounted for normal use on a vehicle.

More recently, multipart molds for curing tires have been reintroduced in which the tire tread molding part is constructed for a plurality of segments which are each movable toward and away from the axis of the mold. In such molds, often referred to as segmented molds, flash may be formed where pairs of segments abut. It has been found that such mold flash, which extends transversely of the tire tread and particularly that flash which extends across otherwise continuous circumferential grooves tends to generate undesirable noise during operation of the vehicle on which such tire is mounted. It is an object of the invention to diminish such noise.

The foregoing and other objects will be made apparent and the principles of the invention will be made clear to persons skilled in the related arts by the following description of a presently preferred embodiment of the invention illustrative of what is at present believed to be the best mode of putting the invention into practice. The description and the annexed drawings are illustrative of the principles of the invention and are not to be taken as limiting the scope of the invention which is set forth in the appended claims.

In the annexed drawings:

FIG. 1 is a perspective view of an apparatus in accordance with the invention shown in operative association with a tire; and FIG. 2 is an enlarged view of the section 2—2 in FIG. 1.

In tires which have been molded and cured in segmented molds, tread rubber (the term being used broadly) tends to be extruded between adjacent pairs of segments so that there is formed a film or web of flash extending transversely of the tread, commonly in a plane parallel to the axis, such that the flash extends completely across one or more of the circumferentially endless grooves in the non-skid pattern of the tread and at several places around the tire. This flash extending transversely of the tread is objected to by many persons not only because of its appearance but because the uninterrupted flash is believed to contribute to noise and/or vibration generated by such a tire in rolling contact with a road surface on which the tire rolls.

Referring to the drawings, and particularly to FIGS. 1 and 2, a web 3 of extruded mold flash 4 extends transversely of the tire 5 in a plane or planes containing the tire axis 6 and extends completely across one or more of the circumferentially endless grooves 7 formed in the non-skid portion of the tire tread 8. The web or webs 3 tend to be formed where the respective segments of the tread mold abut when the tire mold is closed.

It has been found, surprisingly, that such flash 4 and particularly the webs 3 extending between the sidewalls 9 of the grooves 7 can be penetrated and torn, without removal of the flash from the tire and that, by being so penetrated and torn, the noise attributed to the presence of such flash is thereby alleviated to a considerable and useful extent, even though no material part of the flash is actually removed from the tire.

In order to penetrate and to tear the flash extending transversely across a tread groove, a flash tearing instrument 10 is moved into a groove 7 and at least one such instrument into each of such grooves. Relative movement between the instrument 10, and the tire 5 is conveniently effected by rotating the tire while holding the instrument or instruments fixed relative to the tire rotation such that each upstanding web 3 of flash within the or each groove 7 is penetrated and torn. It is found unnecessary for the purpose to cut cleanly or to remove material from the flash.

In order to accomplish rapidly and effectively the penetration and tearing of such webs, the tearing instrument 10 is mounted resiliently so as to move readily into the groove 7 radially of the tire and to follow resiliently any serpentine irregularities of the groove without tearing or scarring of the rubber of the tread elsewhere than at the particular webs.

In order to treat rapidly and effectively each tire to penetrate, and tear open, all of the upstanding flash webs 3 in each of the circumferential grooves 7, a plurality of penetrating and tearing instruments 10 are mounted in a gang arrangement analogous to a common well known leaf rake. The individual tearing instruments 10 are sufficiently closely spaced so that at least one can resiliently enter radially into each of the respectively associated circumferential grooves 7 while others of the tearing instruments 10 slide upon the peripheral surface 14 or surfaces of the tread disposed between the respective pairs of grooves without any harmful effect.

In order to accomplish the aforedescribed method rapidly and effectively in the tire manufacturing process, the perforating and tearing instruments 10 can be conveniently mounted in association with known apparatus adapted to chuck and to rotate such tire about its own rotational axis.

Referring to FIG. 1, a means 20 for mounting and rotating a tire is shown schematically and represents, for example, a well-known white sidewall grinding apparatus or the like upon which the tire 5 can be mounted, preferably inflated, and rotated in the direction indicated, arrow 21. Such mounting means can, of course, accommodate the tire 5 with its axis 6 horizontal as shown, or vertically, or at any oblique angle. A plurality of perforating and tearing instruments 10 are mounted securely in an arcuate holder 22 the curvature of which approximates the transverse profile of the crown of a tire which is to be treated. The holder 22 is mounted to slide on a pair of parallel guide rods 24 and is connected to the piston rod 26 of an actuating cylinder 28 the stroke axis 30 of which lies in or closely parallel to a plane common to the mid-circumferential plane of the tire and is oriented such that the holder 22 together with the plurality of tearing instruments 10 can move toward and away from the tread surface of the tire at a suitable angle with respect to the circumference of the tire tread.

In accordance with the invention, the penetrating and tearing instrument 10 itself, see particularly FIG. 2, comprises a shoe portion 32 which is freely slidable relative to the surfaces of the tread of the tire thereby guiding the instrument so as to prevent its snagging or otherwise damaging the desired tread configuration. The shoe portion 32 terminates in a second portion or tooth 34 which turns upwardly slightly and can advantageously be thinned or sharpened so that the tooth 34 cannot tear or scar the bottom or sidewalls of the groove 7 in which the instrument operates. So long as the portion 34 is shaped to avoid damage to the desired molded surfaces of the tire, any equivalent shape can suffice.

In order that the tearing instrument itself can resiliently enter into a circumferential groove of the tire tread, the shoe portion 32 is joined by a U-shaped bend 36 to an elongated shank 38 which is elastically deflectable sufficiently to resiliently follow the tire groove 7 as the tire is rotated or to follow the road-contacting surface 14 of the tread itself between the grooves. Conveniently, the shank 38 may be integral with the shoe portion and with the penetrating point or tooth 34 and comprise a length of spring wire of, for example, approximately ⅛ inch diameter, and have a free length of approximately 6 inches. The closely spaced plurality of tearing instruments 10 are arranged in parallel side-by-side relation with the planes formed by the U-bend each oriented at least approximately normal to the crown of the tire where it is engaged by the shoe portion of the instrument.

In operation, the tire mounting and rotating means 20 is energized to rotate the tire 5 about its own normal rotation axis 6 and the holder 22 together with the plurality of tearing instruments 10 is moved forward, arrow 25, toward the tire by actuation of the cylinder 28 so that the shoe portion 32 of each of the tearing instruments 10 is urged into slidable engagement with the tread surface sufficiently to deflect the respective elongated shanks 38 by an amount approximately equivalent to the depth of the circumferential groove 7 or grooves in the tire. One or more of the instruments 10 in alignment with a respectively associated circumferential groove 7 is or are urged by the shanks 38 to hold the shoe portion 32 thereof resiliently against the bottom of the respectively associated groove 7, while the shanks 38 aligned with the surfaces 14 between the grooves are simply deflected so that the shoe portions 32 thereof slide harmlessly on the surfaces 14 intermediate the respective grooves. As the tire is rotated, the penetrating terminal teeth 34 first pierce and then tear through the respective webs 3 thereby breaking the continuity of the web 3 across the or each of the respective groove 7. The tire may be rotated one or more complete revolutions whereupon the holder 22 is retracted away from the tire tread and the operation is complete.

While certain representative embodiments and details have been shown for the purpose of illustrating the invention, it will be apparent to those skilled in the art that various changes and modifications may be made therein without departing from the spirit or scope of the invention.

What is claimed is:

1. The method of treating a tire having mold flash extending transversely of a circumferentially endless tread groove therein, comprising inserting a flash tearing instrument into said groove, effecting relative movement between said tire and said instrument in a direction parallel to said groove to cause said instrument to penetrate and to tear said flash.

2. A method as claimed in claim 1, effecting said movement by rotating said tire while holding said instrument in said groove.

3. A method as claimed in claim 2, resiliently urging said instrument radially into said groove while permitting sufficient movement of said instrument to allow said instrument to follow deviations of said groove laterally of the tread pattern of said tire.

4. A method as claimed in claim 3, engaging a multiplicity of such instruments against the tread of said tire so that at least one of said instruments enters radially into and successively engages said flash in a plurality of such grooves extending circumferentially of said tire.

* * * * *